United States Patent [19]

Liesegang

[11] Patent Number: 4,531,081
[45] Date of Patent: Jul. 23, 1985

[54] SERVOMOTOR CONTROL WITH IMPROVED TORQUE LIMITING

[75] Inventor: Terrence R. Liesegang, Phoenix, Ariz.

[73] Assignee: Sperry Corporation, New York, N.Y.

[21] Appl. No.: 474,365

[22] Filed: Mar. 11, 1983

[51] Int. Cl.³ .......................................... G05D 23/275
[52] U.S. Cl. .................................... 318/632; 318/434; 318/599
[58] Field of Search .............. 318/599, 341, 434, 632, 318/432, 681; 244/76 A, 228

[56] References Cited

U.S. PATENT DOCUMENTS

| | | |
|---|---|---|
| 3,379,950 | 4/1968 | Friedline ............................ 318/434 |
| 3,848,833 | 11/1974 | Rauschelbach ................. 318/434 X |
| 4,037,147 | 7/1977 | Smith ................................. 318/632 |
| 4,446,409 | 5/1984 | Rawicz et al. ..................... 318/632 |

Primary Examiner—B. Dobeck
Attorney, Agent, or Firm—Howard P. Terry; Albert B. Cooper

[57] ABSTRACT

An aircraft control surface servomotor control of the pulse width modulation type with precise motor current control for providing precise torque limiting measurements.

5 Claims, 7 Drawing Figures

SERVOMOTOR CONTROL WITH IMPROVED TORQUE LIMITING

BACKGROUND OF THE INVENTION

1. Field of the Invention

The present invention relates generally to automatic flight control systems for aircraft. More particularly, the invention relates to the control surface servomotor control and to the precise measurement of servomotor current, hence servomotor torque, for torque limiting purposes.

2. Description of the Prior Art

As is well known to those skilled in the aircraft autopilot art, safety of flight requirements include provisions for limiting the maximum torque that the autopilot control surface servomotor exerts on the control surface. This requirement is based on the possibility that an autopilot failure could cause a servomotor hardover and therefore if the servomotor had unlimited authority or torque capability, it could cause a severe and dangerous maneuver or threaten the structural integrity of the aircraft. In view of such a possibility, however, remote as it may be, the autopilot designer must demonstrate that servomotor maximum hardover torque is within specified limits before the autopilot may be certified. However, it is also the autopilot designer's goal to provide maximum aircraft controlability under all flight conditions and therefore it is desired to obtain maximum servomotor torque for precise autopilot response and control consistent with the above safety requirements.

In general, many prior art autopilot servomotor controls employ pulse width modulation techniques wherein the magnitude of the total current supplied to the servomotor control windings is a function of the width of current pulses supplied by a current bridge amplifier which in turn is dependent upon the width of voltage pulses supplied by the servoamplifier. A typical pulse width modulation servomotor control system is that disclosed in present assignee's U.S. Pat. No. 3,848,833. As described therein, a power amplifier, driven from a system error amplifier, supplies current pulses to a transistor which in turn controls the bases of the transistors of a power bridge for supplying the current pulses to the control windings of the servomotor. However, in such prior art type systems, the current required to drive the power bridge transistors was not considered in determining maximum servomotor current for torque limiting purposes because it is not possible to calculate current pulse width since it is dependent upon motor load resulting in an error in actual servomotor current measurement by as much as about 7%. Thus, maximum current available for precise autopilot performance had to be reduced by at least this amount to satisfy torque limiting requirements.

SUMMARY OF THE INVENTION

The present invention provides a very precise measurement of actual servomotor current for torque limiting purposes by providing a compensation for the power bridge base drive current. This is accomplished through the provision of an auxiliary circuit which in effect measures the magnitude of the base drive current and then effectively removes its contribution to motor current measurement so that the only current measured is actual motor current. The design of the base drive compensation circuit is such that the accuracy of the current measurement is not affected by any variations in the system power supply.

BRIEF DESCRIPTION OF THE DRAWINGS

A preferred embodiment of the present invention is illustrated in the accompanying drawings wherein.

DESCRIPTION OF THE PREFERRED EMBODIMENT

Figure 1:
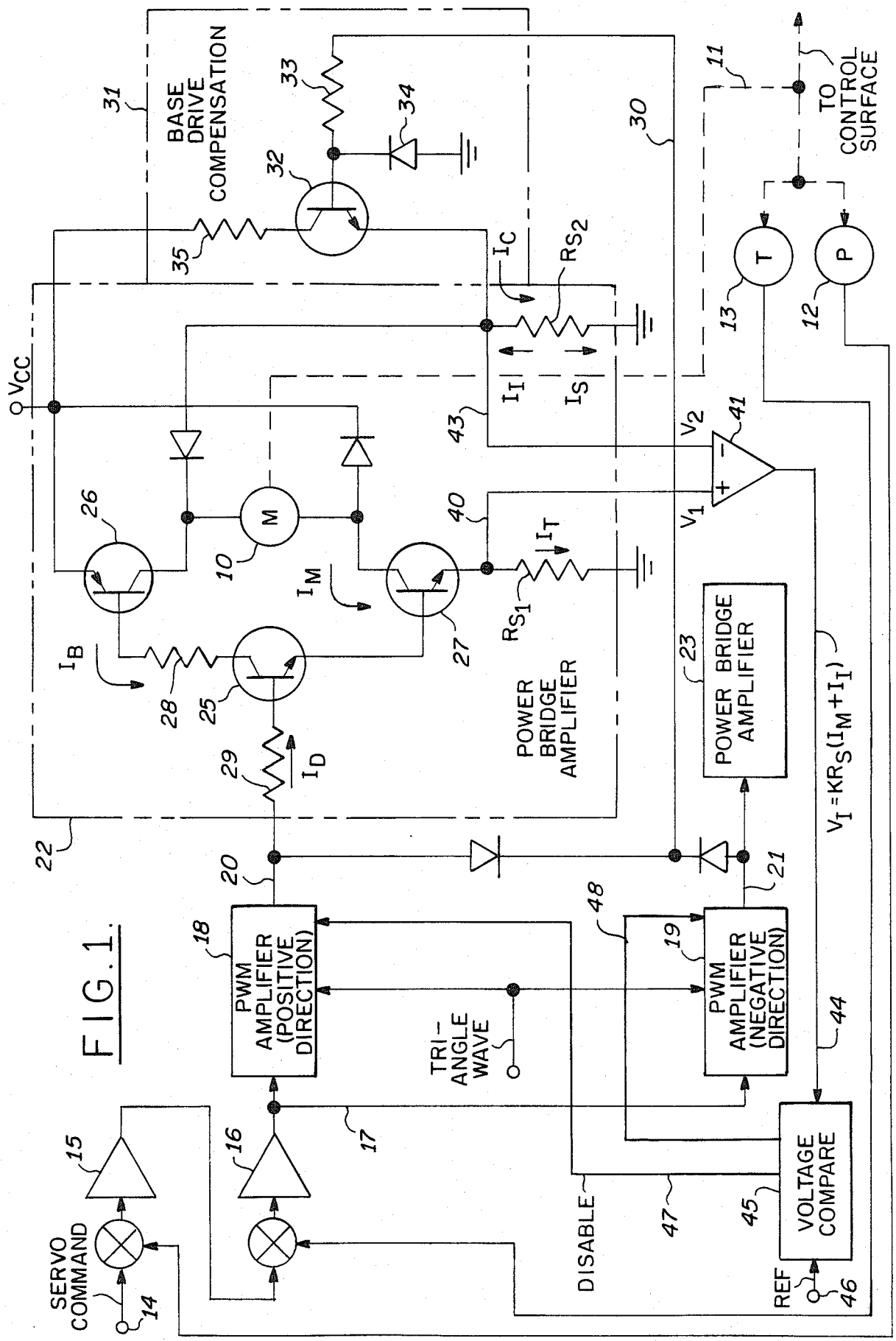
FIG. 1 is a schematic diagram of a typical pulse width modulation controlled autopilot servomotor control apparatus incorporating the present invention.

Referring now to FIG. 1, there is illustrated a conventional autopilot control surface servomotor apparatus employing pulse width modulation (PWM) control and incorporating the base current compensation circuit of the present invention. The basic PWM servomotor control apparatus is generally the same as that disclosed in the above-referenced U.S. Pat. No. 3,848,833. Since its structure and operation are described fully therein, only its general characteristics need be repeated herein. An electric motor 10 is mechanically coupled to drive the aircraft control surface through coupling 11 which may include a convention engage/disengage clutch, reduction gearing and control cable capstan (none shown). Control surface position and velocity are conventionally provided by position sensor 12, such as a potentiometer or synchro and tachometer 13. The autopilot control surface command is provided at the input terminal 14 where it is compared with existing control surface position from position sensor 12 to generate a position error signal at the input of first stage or error amplifier 15. The output of error amplifier 15 is combined with the servomotor velocity damping signal from tachometer 13 and supplied to a second stage amplifier 16, the output of which constitutes the servomotor input command signal on lead 17.

In accordance with conventional PWM control techniques, the motor command signal on lead 17 is supplied to positive and negative PWM comparators 18 and 19 supplied by a triangular reference waveform, the normal zero references of which are raised and lowered by the positive and negative-going output of amplifier 16 to generate positive pulses on leads 20 or 21 having a pulse width proportional magnitude of the control signal on lead 17. These pulses are supplied to a conventional transistor switched bridge power amplifier 22, 23 to drive motor 10 in one direction or the other. For the purpose of disclosing the present invention as briefly and succinctly as possible, only the positive half of bridge amplifier 22 for positive direction of motor drive need be described, it being understood by those skilled in this art that motor drive by the other half of the bridge amplifier is essentially identical.

In accordance with the teachings of the reference '833 patent, torque limiting is achieved by monitoring the current drawn by the servomotor, the voltage produced by this current being compared with a reference voltage corresponding to a predetermined not-to-exceed motor current. If motor current exceeds the limiting current, the input to the bridge amplifier is disabled or alternatively reduced to reduce motor current until it is within limits. However, in this prior art current limiting technique included an error produced by the base drive current of the bridge transistor supplying drive current to the motor. Since motor drive current is dependent upon pulse width and since it is not possible to calculate the current pulse width due to its dependence upon motor loading, its effect on current or torque limiting had to be compromised by lowering the torque limit reference. The uncompensated base drive current can produce an error of as much as about 7% of the total motor current measurement. The present invention provides circuitry for compensating for the power bridge base drive current so as to provide an accurate measure of total motor current.

Figure 2:
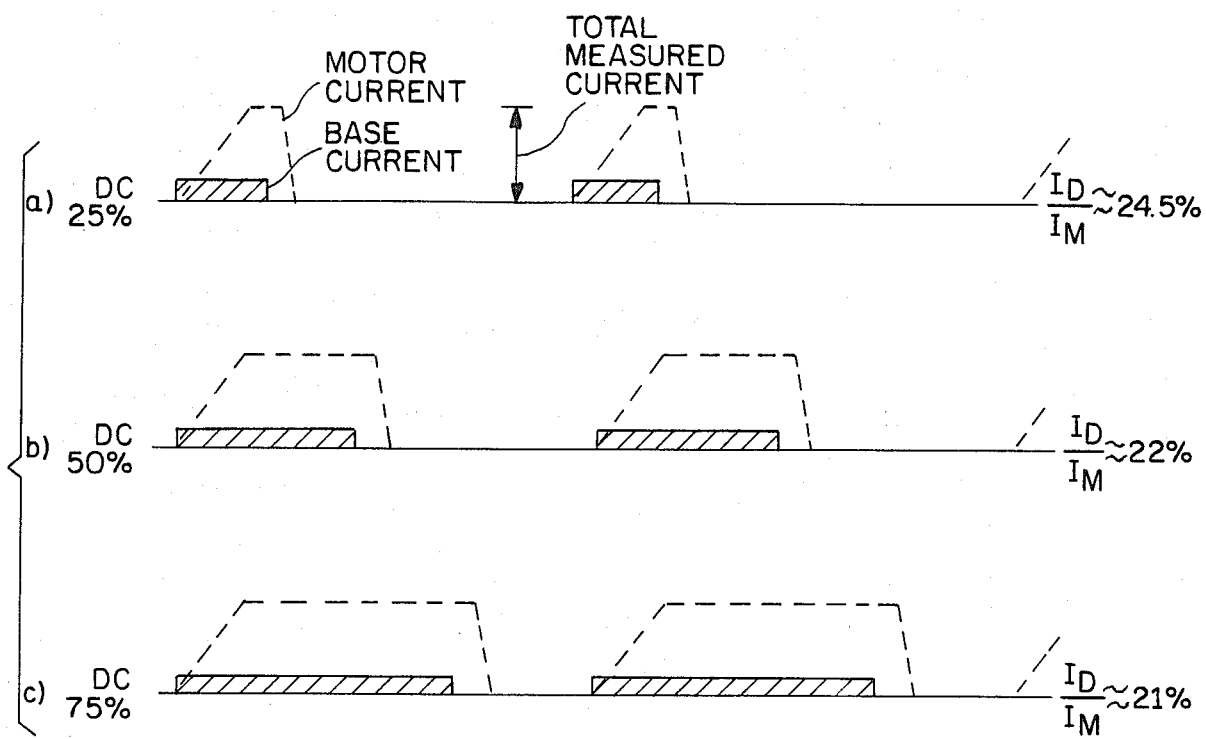
FIGS. 2b, 2c and 3a, 3b, 3c are graphic illustrations of various pulse width duty cycles with and without the use of the present invention respectively.

The foregoing is illustrated in FIG. 2 which illustrates graphically the contribution of the base drive current to total motor current under various pulse width duty cycles. It will be noted that the ratio of bridge drive current $I_D$ to actual motor current $I_M$ is significant at lower duty cycles and decreases only slightly for higher duty cycles.

The present invention can be demonstrated mathematically as follows. The current $I_T$ is the sum of the bridge drive current $I_D$, the actual motor current $I_M$ and the power transistor base drive current $I_B$:

$$I_T = I_M + I_B + I_D \quad (1)$$

Let the current $I_S$ be the sum of the motor winding inductive current $I_I$ and the base drive compensating current $I_C$:

$$I_S = I_C - I_I \quad (2)$$

Circuit components are selected so that $$I_C = I_B + I_D \quad (3)$$

The voltages produced by the currents of equations (1) and (2) flowing through equal value resistances $R_S$ may be amplified in a differential amplifier having a gain $$V_I = K(V_1 - V_2)$$

Letting $V_1 = I_T R_S$ and $V_2 = I_S R_S$, the output of the differential amplifier is $$V_I = K(I_T R_S - I_S R_S) \quad (4)$$

Figure 3:
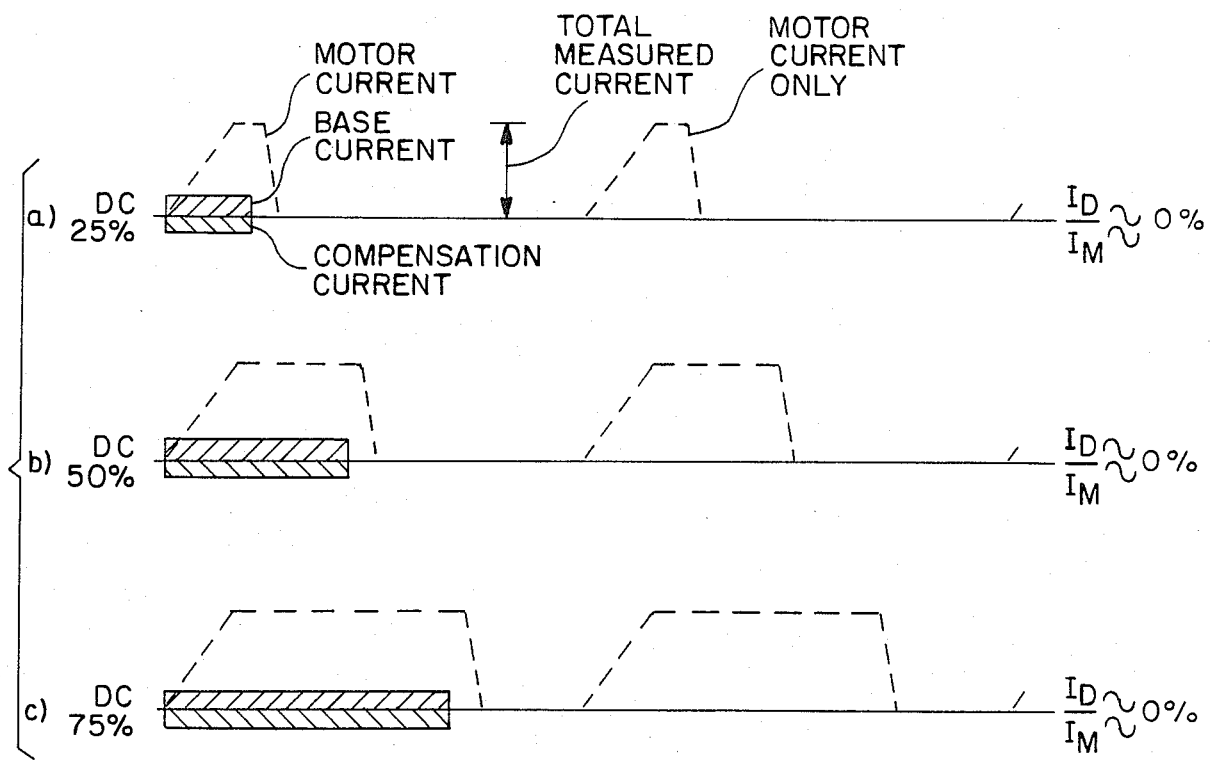

Substituting equations (1) and (2) into equation (4):

$$V_I = K R_S (I_M + I_B + I_D - I_C + I_I) \quad (5)$$

and then substituting equation (3) into equation (5):

$$V_I = K R_S (I_M + I_I)$$

which is the true motor current and is used to more precisely control current or torque limiting for the servosystem. This is graphically illustrated in FIG. 3 wherein the compensation or cancellation of the base current of the transistor bridge results in a true measure of motor current only.

The circuit for accomplishing this base drive compensation of the present invention is illustrated in FIG. 1 wherein the pulse output of PWM amplifier 18 turns on transistor 25 which results in current flow from power supply $V_{CC}$ through transistor 26, motor 10, transistor 27 and resistor $R_{S1}$ to ground. In addition, the base current bridge transistor 25 also flows through resistor 28, transistors 25 and 27 together with the drive current from PWM amplifier through resistor 29. Thus, as illustrated in FIG. 1, the current $I_T$ flowing through resistor $R_{S1}$ to ground is the sum of the motor current $I_M$, the bridge drive current $I_D$ and the power amplifier base drive current $I_B$ of the bridge transistor 27 as set forth in equation (1) above.

In accordance with the present invention, the output of PWM amplifier 18 is also supplied via lead 30 to a base drive compensation circuit 31 comprising transistor switch 32, its base resistor 33, blocking diode 34, and scaling resistor 35 connected between transistor 32 and power supply $V_{CC}$. It should be noted that the base drive conpensation circuit is supplied from the same power supply as the power bridge so that any fluctations in power supply voltage do not effect the compensation. When the power bridge is turned on, the compensation circuit is also turned on resulting in compensation current flow $I_C$ from supply $V_{CC}$ through resistor $R_{S2}$ to ground. The compensation circuit component values are selected such that $I_C = I_B + I_D$ in accordance with equation (3) above. Also, motor winding inductive current $I_I$ also flows through resistor $R_{S2}$. Thus, the current flow $I_S$ through resistor $R_{S2}$ is the sum of compensation current $I_C$ and motor inductive current $I_I$ in accordance with equation (2) above.

The voltage $V_1$ resulting from the current flow $I_T$ is applied via lead 40 to the other input of differential amplifier 41 while the voltage $V_2$ resulting from current flow $I_S$ is applied via lead 43 to the other input thereof; the value of resistors $R_{S1}$ and $R_{S2}$ is the same. The gain K of differential amplifier 41 is such that its output $V_I$ on lead 44 is equal to $V_I = K R_S (I_M + I_I)$ as derived above, this voltage representing only the actual motor current which, of course, represents motor torque. Now the motor torque can be precisely limited, uncontaminated by other currents in the bridge drive amplifier, particularly the base current required to drive the bridge.

Therefore, the voltage on lead 44 representing motor current is supplied to a voltage comparator 45 where it is compared with a predetermined reference voltage from power supply 46. The reference voltage is selected to be proportional to the torque limit imposed on the motor 10. Thus, if the voltage $V_I$ exceeds the reference voltage, and output will appear on comparator output lead 47 and 48 which is used to disable both PWM amplifiers 18 and 19.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. In an autopilot system for aircraft having a servoamplifier and an electric servomotor responsive thereto for driving a control surface of said aircraft in accordance with a servoamplifier command signal, said servoamplifier including a power supply and signal responsive means for limiting the torque output of said servomotor, the combination comprising:

(a) power amplifier means responsive to said command signal and including at least one transistor coupled between said power supply, the control windings of said motor and ground for supplying motor drive current, (b) means for providing a measure of said motor current, said measuring means being further responsive to the base drive current of said transistor, (c) base drive compensation circuit means coupled between said power supply and ground for providing a compensation current effectively equal to said base drive current, and (d) means responsive to said compensation current for cancelling the effect of said base drive current on said motor drive current measureng means.

2. The combination as set forth in claim 1 wherein said motor current measuring means comprises:

(a) first resistor means responsive to said motor drive current and said base drive current for providing a first voltage representative of the sum of said currents, (b) second resistor means responsive to said compensation current for providing a second voltage representative thereof, and (c) differential means responsive to said first and second voltages for providing an output signal representative of substantially only said motor drive current.

3. The combination as set forth in claim 2 wherein said torque limiting means comprises:

(a) signal comparator means, (b) reference means for supplying a signal having a value representative of a maximum torque output of said seromotor, and (c) means for supplying said reference signal and said differential amplifier output signal to said signal comparator means.

4. The combinations as set forth in claim 3 wherein said base drive compensation means comprises:

(a) switch means for supplying said compensation signal to said second resistor means, and (b) means responsive to said servoamplifier command signal for operating said switch means.

5. The combination as set forth in claim 4 wherein said base drive compensation means further comprises:

(a) circuit means connected between said power supply and said second resistor means for rendering the value of said compensation current substantially equal to said base drive current.

* * * * *